United States Patent [19]

Egashira

[11] Patent Number: 4,581,515

[45] Date of Patent: Apr. 8, 1986

[54] LASER BEAM MODULATING METHOD AND APPARATUS

[75] Inventor: Ichiro Egashira, Atsugi, Japan

[73] Assignee: Amada Company, Limited, Japan

[21] Appl. No.: 477,949

[22] Filed: Mar. 23, 1983

[30] Foreign Application Priority Data

Mar. 25, 1982 [JP] Japan ................... 57-46343

[51] Int. Cl.⁴ .................. B23K 9/00; G02B 26/02
[52] U.S. Cl. .................. 219/121 LN; 350/272; 350/274
[58] Field of Search .......... 219/121 LG, 121 FS, 219/121 LN; 350/266, 272, 274, 275, 273

[56] References Cited

U.S. PATENT DOCUMENTS

| | | | |
|---|---|---|---|
| 3,435,213 | 3/1969 | Colbow et al. | 350/273 |
| 3,942,878 | 3/1976 | Engel et al. | 350/274 |
| 4,118,619 | 10/1978 | McArthur et al. | 219/121 LY |
| 4,165,919 | 8/1979 | Little | 350/273 |
| 4,202,602 | 5/1980 | Torres | 350/272 |
| 4,335,296 | 6/1982 | Bredow | 219/121 LG |
| 4,409,463 | 10/1983 | Duruz et al. | 219/121 LG |
| 4,412,120 | 11/1983 | Duruz et al. | 219/121 LG |
| 4,434,349 | 2/1985 | Tsutsumi | 219/121 LG |

FOREIGN PATENT DOCUMENTS

| | | |
|---|---|---|
| 0047604 | 3/1982 | European Pat. Off. |
| 52-64959 | 5/1977 | Japan |
| 2028381 | 3/1980 | United Kingdom |

*Primary Examiner*—S. C. Buczinski
*Assistant Examiner*—David Cain
*Attorney, Agent, or Firm*—Wigman & Cohen

[57] ABSTRACT

A laser beam modulating method is characterized in that the distribution of power density of the laser beam is changed by closing and opening a passage for the laser beam from a laser resonator. An apparatus for carrying out the method includes a modulator for opening and closing the passage for the laser beam from the laser resonator to a laser processing head assembly.

12 Claims, 5 Drawing Figures

4,581,515

LASER BEAM MODULATING METHOD AND APPARATUS

BACKGROUND OF THE INVENTION

1. Field of the Invention

The present invention relates generally to a laser processing apparatus for processing various materials such as sheet metals, and more particularly the present invention pertains to a laser beam modulating method and apparatus for modulating a distribution of the power density of the laser beam in a laser processing apparatus.

2. Description of the Prior Art

It is well known that a laser beam, which is produced by a laser resonator, can be used to process or cut various materials such as sheet metals, and as a matter of course, it has been desired that much more accurate processing be made by a laser beam. Although a laser resonator of a pulsed laser type can perform more accurate processing than a resonator of a continuous wave laser, the former is bulky in size and therefore costly as compared with latter of the equivalent output.

SUMMARY OF THE INVENTION

It is a general object of the present invention to provide a method and apparatus for enabling a laser beam to perform an accurate processing on a material such as a sheet metal.

It is an object of the present invention to provide a method and apparatus for pulsing a laser beam of a continuous wave loser to perform an accurate processing.

It is another object of the present invention to provide a method and apparatus for modulating a laser beam to accomodate the distribution of the power density of the laser beam to a laser processing apparatus.

It is another object of the present invention to provide an apparatus which can be selectively used to pulse and modulate a continuous wave laser beam.

In order to attain these objects according to the present invention, a means is provided in the passage of the laser beam from the laser resonator so that it can gradually open and close the passage.

Other and further objects and advantages of the present invention will be apparent from the following description and accompanying drawings, which by way of illustration show a preferred embodiment of the present invention and the principles thereof.

DESCRIPTION OF THE PREFERRED EMBODIMENTS

Figure 1:
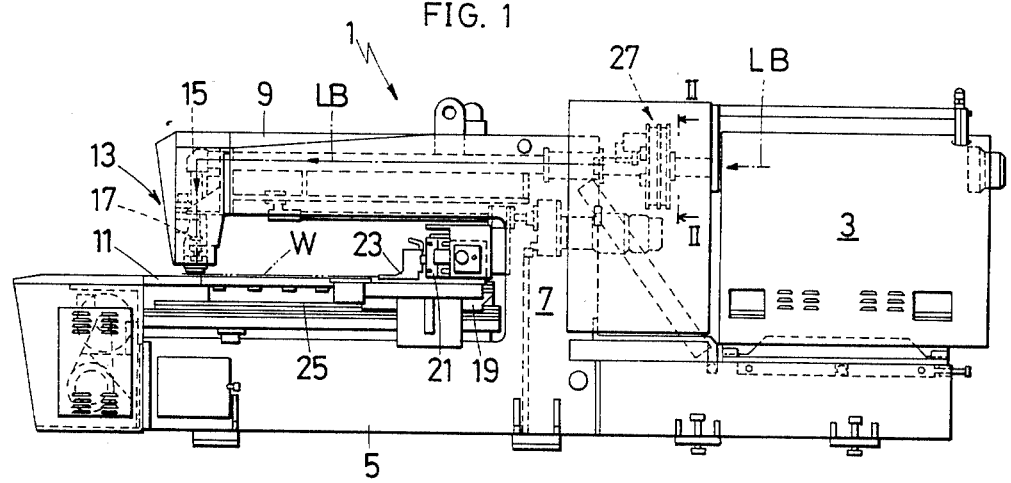
FIG. 1 is a side elevational view of a laser processing machine provided with a beam modulating apparatus according to the present invention.

Referring now to FIG. 1, there is shown a laser processing machine which is generally designated by the numeral 1 and is connected with a laser resonator 3 such as a $CO_2$ (carbon dioxide gas) laser resonator. The laser resonator 3, which may be a commercially available one, is so arranged as to generate laser beam LB and direct it to the laser processing machine 1 as shown in FIG. 1, and it is directly integrally connected to the rear of the laser beam cutting apparatus in the preferred embodiment.

The laser processing machine 1 comprises a base 5, a post 7 vertically formed or fixed to the base 5 and an overhead beam 9 horizontally supported over the base 5 by the post 7 in a cantilever manner. The base 5 is provided at its top with a work-table 11 having a number of slide balls on which a workpiece W, such as a sheet metal, is horizontally placed before processing. The overhead beam 9 is provided at its forward end with a processing head assembly 13 which includes a mirror assembly 15 and a focussing lens 17. The mirror assembly 15 is arranged to reflect the laser beam LB delivered from the laser resonator 3 toward the workpiece W and the focussing lens 17 is disposed to focus and apply the laser beam LB to the workpiece W together with an assisting gas such as oxygen gas. Thus, the laser processing machine 1 of the above construction is so arranged as to receive the laser beam LB from the laser resonator 3 and apply the laser beam LB to the workpiece W through the focussing lens 17 in the processing head assembly 13, as shown by the arrow, to process the workpiece W.

In order to feed and position the workpiece W to be processed, the laser processing machine 1 is provided with a first carriage 19 horizontally movable and a second carriage 21 which holds a plurality of work clamping means 23 for clamping the workpiece W. The first carriage 19 is slidably mounted on a pair of rails 25 which are fixed on the upper portion of the base 5 in parallel with each other so that it may be moved toward and away from the processing zone just beneath the processing head assembly 13 when driven by power. The second carriage 21 holding the work clamping means 23 is slidably mounted on the first carriage 19 so that it may be horizontally moved by power at right angles with the rails 25. Thus, the workpiece W which is gripped by the work clamping means 23 can be fed on the work-table 11 into a position beneath the processing head assembly 13 by moving the first and second carriages 19 and 21.

In the above described arrangement, the workpiece W can be processed by the laser beam LB when it is positioned just beneath the cutting head assembly 13 on the work-table 11 by the first and second carriages 19 and 21. Of course, the laser beam LB, which is produced by the laser resonator 3, is delivered into the processing head assembly 13 and directed downwardly by the mirror assembly 15, as shown by the arrow, and then applied to the workpiece W after being focussed by the focussing lens 17 together with an assist gas such as oxygen gas.

Figure 2:
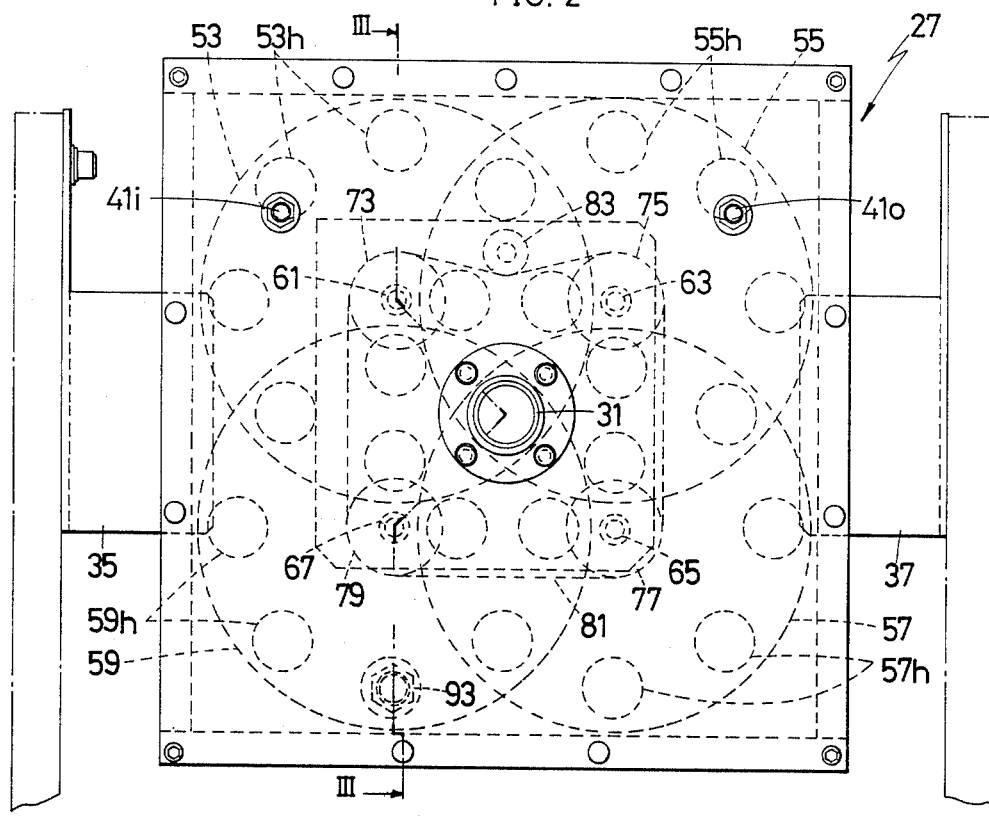
FIG. 2 is an enlarged sectional view taken along the line II—II of FIG. 1.
Figure 3:
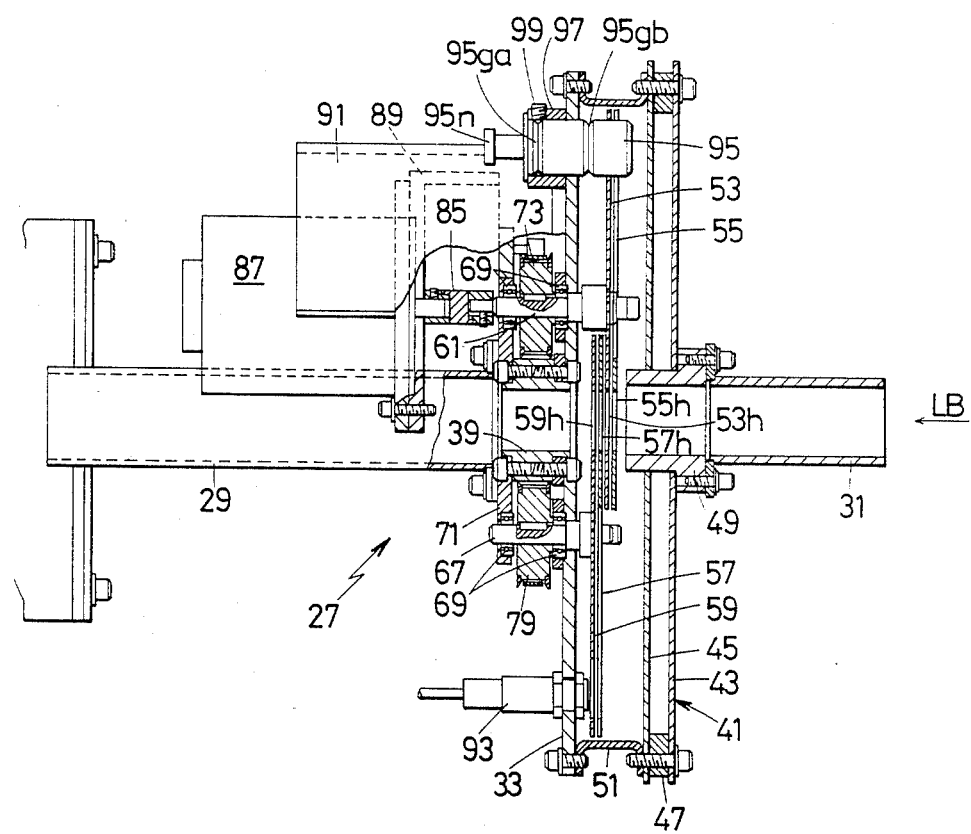
FIG. 3 is a sectional view taken on a plane along the line III—III of FIG. 2.

Referring to FIGS. 2 and 3, a power modulating apparatus 27 according to the present invention is provided between a conduit 29 connected to the laser processing machine 1 and a conduit 31 connected to the laser resonator 3 so that the laser beam LB can be transmitted therethrough. The power modulating apparatus 27 comprises constructionally a base plate 33 which is fixed to a portion of the laser processing machine 1 by means of brackets 35 and 37 and is provided at its central portion with a sleeve member 39 connected to the conduit 29 to enable the laser beam LB to go therethrough. The power modulating apparatus 27 comprises also a cooling jacket 41 which is constructed of a pair of plates 43 and 45 connected with each other by a spacer or spacers 47 and is provided at its central portion with a sleeve member 49 connected to the conduit 31. Specifically, the cooling jacket 41 is watertight and is so constructed that the plates 43 and 45 are connected by the spacer or spacers 47 with the sleeve member 49 passing therethrough. Cooling jacket 41 contains coolant and is provided with inlet and outlet ports 41i and 41o for the coolant. Also, the base plate 33 and the cooling jacket 41 are connected with each other by a spacer or spacers 51 to form a housing therebetween in a manner such that the sleeve members 39 and 49 are aligned coaxially with each other to provide a straight passage for the laser beam LB. Thus, the laser beam LB transmitted to the conduit 31 from the laser resonator 3 can be sent through the sleeve members 49 and 39 and the conduit 29 to the processing head assembly 13 of the laser processing machine 1. Also, it will be understood that the space between the base plate 33 and the cooling jacket 41 will be kept cooled by the cooling jacket 41.

As is shown also in FIGS. 2 and 3, the power modulating apparatus 27 comprises further a plurality of rotatable beam chopping disks 53, 55, 57 and 59 which are each provided with a plurality of circular holes 53h, 55h, 57h and 59h, respectively. The beam chopping disks 53, 55, 57 and 59 are rotatably held in the space between the base plate 33 and the cooling jacket 41 by shafts 61, 63, 65 and 67, respectively, which are horizontally disposed in parallel with each other. The holes 53h, 55h, 57h and 59h of the beam chopping disks 53, 55, 57 and 59, respectively, are formed at an equal radial distance from the shafts 61, 63, 65 and 67, respectively. Also, the shafts 61, 63, 65 and 67 are so located that the beam chopping disks 53, 55, 57 and 59 will partially overlap each other and furthermore their holes 53h, 55h, 57h and 59h will align the passage of the laser beam LB between the sleeve members 39 and 49 when they are rotated. Stated otherwise, the beam chopping disks 53, 55, 57 and 59 are so arranged as to open and close the passage of the laser beam LB between the sleeve members 39 and 49 when the holes 53h, 55h, 57h and 59h are brought into and out of arrangement therewith when they are being rotated around the shafts 61, 63, 65 and 67. Also, the beam chopping disks 53, 55, 57 and 59 are so arranged as to simultaneously or synchronously bring their holes 53h, 55h, 57h and 59h into and out of alignment with the passage of the laser beam LB when they are rotated.

In the above described arrangement, each of the beam choppng disks 53, 55, 57 and 59, when rotated, will gradually open and close the passage of the laser beam LB from its outer portion as the holes 53h, 55h, 57h and 59h are brought into and out of complete alignment therewith. However, the passage of the laser beam LB will be gradually opened radially from the center thereof and will be gradually closed radially from the outer periphery, since the four beam chopping disks 53, 55, 57 and 59 will bring their own holes 53h, 55h, 57h and 59h, respectively, into and out of alignment with the passage in four different directions. Thus, when the beam chopping disks 53, 55, 57 and 59 are being rotated, the central portion of the passage of the laser beam LB will be opened longer than the outer portion thereof, so that the outer portion of the laser beam LB, which is lower in power density, will be reduced in energy after the laser beam LB has passed the power modulating apparatus 27. Also, when the beam chopping disks 53, 55, 57 and 59 are being rotated, the laser beam LB will be chopped and pulsed by them so that it will be intermittently transmitted as pulses from the laser resonator 3 to the laser processing head assembly 13. In this connection, it will be readily understood that the number of the beam chopping disks can be changed by being added or omitted for the purpose of the invention, although four beam chopping disks 53, 55, 57 and 59 are shown in the preferred embodiment.

As shown in FIG. 3, the shafts 61, 63, 65 and 67 of the beam chopping disks 53, 55, 57 and 59 are journaled in bearings 69 which are provided on the outer-side of the base plate 33 and also on a holding plate 71 which is vertically fixed to the sleeve member 39 therearound at a space from the base plate 33. More particularly, the shafts 61, 63, 65 and 67 are rotatably and horizontally held between the base plate 33 and the holding plate 71 by means of the bearings 69. Also, as shown in FIGS. 2 and 3, the shafts 61, 63, 65 and 67 are provided with pulleys 73, 75, 77 and 79, respectively, around which an endless belt 81 is trained in order to drive the beam chopping disks 53, 55, 57 and 59. The pulleys 73, 75, 77 and 79 are equal in diameter and are fixed to the shafts 61, 63, 65 and 67, respectively, so that they can be rotated therewith between the base plate 33 and the holding plate 71. The belt 81 is kept tensioned by an idle wheel 83 which is freely rotatably provided on the holding plate 71 and is so arranged as to be adjustable by a suitable means such as an eccentric shaft to adjust the tension of the belt 81. Also, the shaft 61, is connected, by means of a coupling 85, to a motor 87 which is mounted on the base plate 33 by means of a motor base 89 and a bracket 91. Thus, when the motor 87 is put into motion, the shaft 61 will be driven by the motor 87 not only to rotate the beam chopping disk 53 directly but also to rotate the beam chopping disks 55, 57, and 59 through the pulley 73, the belt 81, the pulleys 75, 77 and 79 and the shafts 63, 65 and 67. In this connection, it will be of course readily understood that the motor 87 can be so provided as to be connected to either of the shafts 63, 65 and 67 instead of the shaft 61 for the purpose of the invention, although it is connected to the shaft 61 in the preferred embodiment.

As is also shown in FIG. 3, a proximity switch 93 is provided at a portion of the base plate 33 in face of the track or course where the holes 59h of the beam chopping disks 59 will run when rotated. The proximity switch 93 is so arranged as to detect the rotation of the beam chopping disk 59 by detecting the number of the holes 59h passing thereby to control the motor 87 so as to control the rotations of the beam chopping disks 53, 55, 57 and 59 to a set value. As is readily apparent, the rotations or the beam chopping disks 53, 55, 57 and 59 can be controlled by detecting only the rotation of the beam chopping disk 59, since they are simultaneously or synchronously driven by the motor 87 through the belt 81. Also, it will be of course readily understood that the proximity switch 93 can be so provided as to detect the number of the holes 53h, 55h or 57h of the beam chopping disks 53, 55 and 57, respectively, instead of that of the holes 59h of the beam chopping disk 59.

As is shown further in FIG. 3, a fastening pin 95, which is provided with a knob 95n at its end and is formed with annular grooves 95ga and 95gb, is provided on the base plate 33 in order to stop the beam chopping disks 53, 55, 57 and 59 from rotating at will. The fastening pin 95 is horizontally slidably held in a sleeve-like holder 97 so that it may be moved through the base plate 33 into and out of engagement with the holes 53h of the beam chopping disk 53 when manually pushed and pulled. The sleeve-like holder 97 is mounted on the base plate 33, and it is provided with a ball plunger 99 which is kept resiliently biased to the fastening pin 95 to be alternatively put into engagement with either of the annular grooves 95ga and 95gb of the fastening pin 95. The arrangement is such that the fastening pin 95 is in and out of engagement with one of the holes 53h of the beam chopping disk 53 when the ball plunger 99 is in engagement with the annular grooves 95ga and 95gb, respectively. More specifically, the fastening pin 95 is kept away from the beam chopping disk 53 when the ball plunger 99 is in engagement with the annular groove 95gb, and it is held in engagement with one of the holes 53h of the beam chopping disk 53 when the ball plunger 99 is in engagement with the annular groove 95ga. Thus, the beam chopping disk 53 is stopped by the fastening pin 95 from rotating when the fastening pin 95 is inserted in one of the holes 53h thereof with the ball plunger 99 engaged with the annular groove 95ga, but the beam chopping disk 53 can be freely rotated when the beam chopping disk 53 is held away from the fastening pin 95 when the ball plunger 99 is engaged with the annular groove 95gb. As is readily apparent, all of the beam chopping disks 53, 55, 57 and 59 can be simultaneously stopped from rotating together only by holding the beam chopping disk 53 from rotating, since the disks 53, 55, 57, and 59 are connected together by the belt 81 trained around the pulleys 73, 75, 77 and 79. Also, it will be readily understood that the fastening pin 95 can be so provided as to be put into the holes 55h, 57h or 59h of the beam chopping disks 55, 57 or 59 instead of the hole 53h of the beam chopping disk 53. Furthermore, the fastening pin 95 can be so arranged as to be put simultaneously into two holes of two of the four beam chopping disks 53, 55, 57 and 59, since two neighboring disks of the four beam chopping disks 53, 55, 57 and 59 will partially overlap with each other with their holes horizontally aligned with each other.

Figure 4:
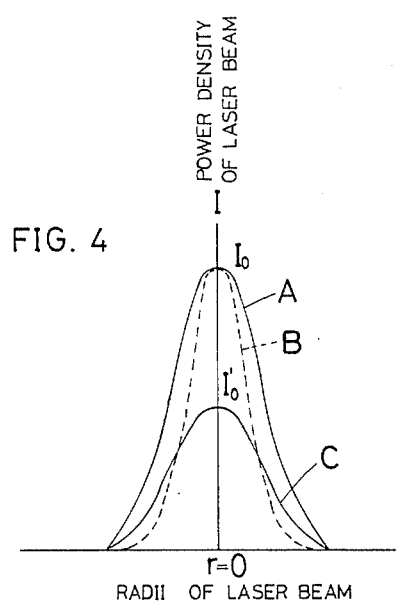
FIG. 4 shows a distribution of the power density of a laser beam in the case of a single mode.

Referring to FIG. 4, the distribution of the power density I (W/cm$^2$) of the laser beam LB in the case of a single mode is graphically shown as a function of the radius r (cm) of the laser beam LB. The radius r is the distance of the measuring point o from the center of the laser beam LB. The distribution of the power density of the laser beam LB shown in FIG. 4 has been taken on the focus plane that is at right angles to the passage of the laser beam LB at the portion where the laser beam LB is focussed by the focussing lens 17. In FIG. 4, the curve A shows the distribution of the power density of the laser beam LB of continuous output 900W, and the curve C shows the distribution of the power density of the laser beam LB of continuous output 300W. It will be understood that FIG. 4 shows the distribution of the density of energy of the laser beam LB when the time is taken as 1 second.

The power density I is generally given by the following formula (1) as a function of the radius r:

$$I = I_o \exp(-2r^2/r_o^2) \qquad (1)$$

where
$I_o$: power density of the focussed beam
r: distance from the center of the beam on the focus plane
$r_o$: radius of the beam spot at the focus Also, the output P(W) is described by the following formulas (2) and (3) as a volume of the revolution which is made by rotation of the curve A around the longitudinal axis I in FIG. 4:

$$P = \int_0^{\cdot I_o} \pi r^2 dI \qquad (2)$$

$$P = \pi r_o^2 I_o / 2 \qquad (3)$$

$$I_o = 2P/\pi r_o^2 \qquad (4)$$

The diameter $d_o$ of the beam spot at the focus is generally given by the following formula (5):

$$d_o = 2r_o = 4\lambda f/\pi D_o \qquad (5)$$

where
$D_o$: diameter of incident beam
$\lambda$: wave length of incident beam
f: focal length of the focussing lens Referring again to FIG. 4, the curve B shows the distribution of the average power density of the laser beam LB of continuous output 900W which is obtained by using the power modulating apparatus 27 according to the present invention. As a result of an experiment, the actual power output of the laser beam LB of continuous output 900W was reduced to 300W by the modulating apparatus 27 according to the present invention. However, the maximum power density of the laser beam LB obtained in the experiment was substantially equal to the maximum power density $I_o$ of the laser beam LB of continuous output 900W which was obtained according to the aforementioned formulas (4) and (5). It will be understood that a volume of a revolution which is made by rotating the curve B is equal to that of a revolution which is made by rotating the curve C, since the outputs shown by the curves B and C are equal to each other. As seen from FIG. 4, the maximum power density of the laser beam LB shown by the curve B is maintained at the same level as the curve A, although the power output has been reduced from the original power output 900W. The power density of the laser beam LB shown by the curve B in FIG. 4 is distributed symmetrically around the longitudinal axis I since the passage of the laser beam LB will be gradually opened from the center and will then be gradually closed from the outer portion by the beam chopping disks 53, 55, 57 and 59 as has been described hereinbefore. Also, the power density of the laser beam LB shown by the curve B has been changed by the modulating apparatus 27 according to the present invention to have a steeply outstanding profile so that the laser beam LB can perform an accurate processing. It will be understood that the laser beam LB can perform an accurate processing without undesirable heat influence on the workpiece W since the peripheral portion of the laser beam LB, which is lower in power density, has been eliminated by the power modulating apparatus 27 according to the present invention.

Figure 5:
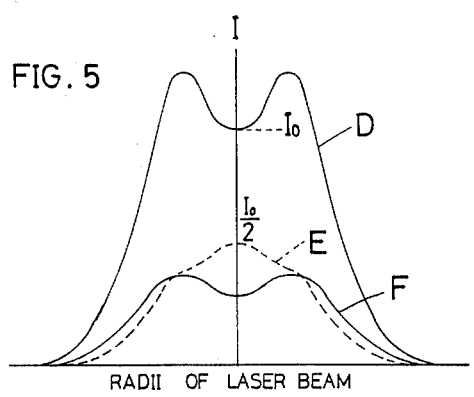
FIG. 5 shows a distribution of the power density of the laser beam in the case of a multi-mode.

Referring to FIG. 5, the distribution of the power density I of the laser beam LB in the case of a multimode is graphically shown as a function of the radius r in the same manner as the single mode shown in FIG. 4. The curve D shows the distribution of the laser beam LB of continous output 900W, and the curve F shows the distribution of the power density of the laser beam LB of continous output 300W. The curve E shows the distribution which is produced when the laser beam LB of continuous output 900W is modulated by the power modulating apparatus 27 according to the present invention.

As has been so far described in the above paragraphs, the laser beam LB will be pulsed and modulated by the power modulating apparatus 27 according to the present invention so that its outer portion, which is lower in power density, may be reduced in energy without changing the maximum power density at its central portion. Accordingly, the laser beam LB which has passed the laser modulating apparatus 27 will be sharply applied intermittently as pulses to the workpiece W to be processed through the processing head assembly 13 with high power density without undesirable heat influence in order to accurately process the workpiece W. However, it will be understood that the laser beam LB can be directly applied to the workpiece W without being pulsed and modulated by the power modulating apparatus 27 in cases where accurate processing is not desired.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A laser beam modulator comprising:
    a plurality of rotating means each having openings for the passage therethrough of a laser beam;
    a plurality of shafts arranged axially parallel to one another, each of said rotating means being supported by one of said shafts;
    drive means for driving at least one of said shafts;
    drive transmission means directly connecting each of said shafts with said drive means whereby when said drive means is operative to drive said shafts and said rotating means, said rotating means synchronously bring their openings into and out of alignment with the passage of the beam.

2. The laser beam modulator of claim 1, wherein said rotating means comprise discs which are arranged so as to partially overlap one another.

3. The laser beam modulator of claim 2, wherein the discs rotate on substantially parallel axes.

4. The laser beam modulator of claim 3, wherein the openings on the discs cooperate with each other to form an adjustable iris-like opening through which the laser beam passes.

5. The laser beam modulator of claim 1, further comprising an adjustable idler wheel connected to said drive transmission means.

6. The laser beam modulator of claim 1, further comprising a proximity switch arranged so as to detect the openings in said rotating means and thereby control said drive means.

7. A laser beam modulating method comprising the steps of:
    tranmitting a laser beam from a laser resonator through a passage to a laser processing head assembly;
    rotating a plurality of overlapping, coaxially parallel rotating means having openings therein through which the laser beam is transmitted; and
    driving said rotating means so as to synchronously rotate said openings.

8. The method according to claim 7, including the step of cutting a workpiece with the transmitted laser beam.

9. Apparatus for modulating a laser beam adapted to be positioned between a laser resonator and a laser processing head assembly comprising:
    a first conduit adapted to be connected to said laser resonator;
    a second conduit adapted to be connected to said laser processing head and aligned coaxially with said first conduit to provide a path for said laser beam;
    a base means adapted to connect said second conduit to said laser processing machine;
    a cooling jacket containing a fluid coolant surrounding said first conduit;
    a cooling chamber formed between said first conduit and said second conduit by said base means and said jacket in thermal contact with said cooling jacket, said chamber containing a separate fluid coolant;
    modulating means for selectively interrupting the passage of the laser beam disposed in said cooling chamber.

10. The laser beam apparatus of claim 9, wherein the coolant jacket comprises a pair of plates and one or more watertight spacers.

11. The laser beam apparatus of claim 9, wherein the base means supports a plurality of shafts which support said modulating means.

12. The laser beam apparatus of claim 11, wherein said modulating means include a plurality of rotating means, each of said rotating means retained on one of said shafts, said rotating means being formed with a plurality of opening means for allowing the laser beam to be transmitted therethrough.

* * * * *